E. M. CONRAD.
NUT LOCK.
APPLICATION FILED JUNE 13, 1913.

1,132,073.  Patented Mar. 16, 1915.

Witnesses
G. M. Spring.
B. F. Garvey Jr.

Inventor
Ezra M. Conrad,
By Richard Oliver
his Attorney

UNITED STATES PATENT OFFICE.

EZRA M. CONRAD, OF SEVILLE, OHIO.

NUT-LOCK.

1,132,073. Specification of Letters Patent. Patented Mar. 16, 1915.

Application filed June 13, 1913. Serial No. 773,544.

*To all whom it may concern:*

Be it known that I, EZRA M. CONRAD, citizen of the United States, residing at Seville, in the county of Medina and State of Ohio, have invented certain new and useful Improvements in Nut-Locks, of which the following is a specification.

This invention relates to nut locks and has for its primary object to provide a means which is associated with the nut for preventing casual reverse rotation of the nut on the bolt thereby especially adapting the same for use on railroads or the like where it is desired to have a positive locking means so as to eliminate dangers occurring by the nut being accidentally displaced on the bolt due to the vibration caused by the rolling stock passing over the rails.

Another object of this invention resides in the provision of a locking member which is carried by the nut proper, the said member having a tooth formed thereon which engages or bites in the threads of the bolt, so as to allow for the free rotation of the nut on the bolt but will prevent the reverse rotation of the same, unless the tooth is released from the bolt threads, by an operation which will be more fully hereinafter set forth.

Other objects as well as the nature, characteristic features and scope of my invention will be more readily understood from the following description taken in connection with the accompanying drawings and pointed out in the claim forming a part of this specification.

Figure 1:
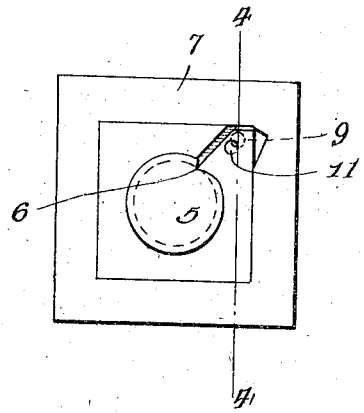
Figure 2:
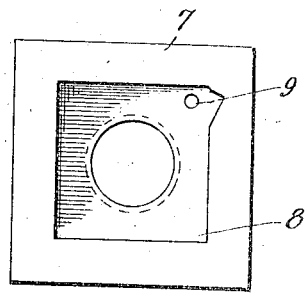
Figure 3:
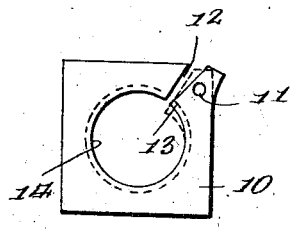
Figure 4:
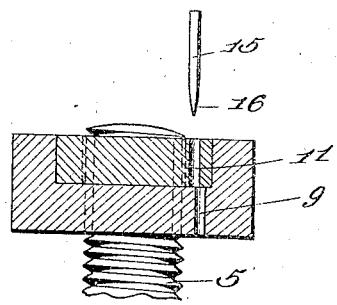

Referring to the drawings:—Figure 1 is a top plan view of the device constructed in accordance with my invention; Fig. 2 is a plan view of the nut; Fig. 3 is a plan view of the locking member; and Fig. 4 is a cross sectional view taken on the line 4—4 of Fig. 1, showing the releasing key.

In the drawings wherein is shown the preferred form of my invention a bolt 5 is provided which has formed thereon the ordinary screw threads and is provided with a longitudinal extending groove 6.

The nut is indicated at 7 and is provided with an interiorly threaded bore, adapted for engagement on the threaded shank of the bolt 5, and is provided with a rectangular centrally depressed portion 8 and an aperture 9 which extends therethrough and is in communication with the depressed portion 8. Adapted for engagement in the depressed portion 8 of the nut 7 is a member 10 which conforms to the configuration of the depressed portion 8 and has an aperture 11 formed therein which normally partially alines with the aperture 9 of the nut 7. In proximity to the aperture 11 of the member 10 is a diagonal slit 12 which is formed so as to provide a tooth 13 which is adapted for engagement in the longitudinal groove 6 of the bolt 5, when the nut is turned in a reverse direction on the bolt. The member 10 is preferably formed of a spring metal so that the tooth 13 will normally extend inwardly as shown to advantage in Figs. 1 and 3 of the drawings, so as to positively prevent the accidental displacement of the nut with respect to the bolt. An internally threaded bore 14 is likewise provided on the member 10 so as to engage the threaded shank of the bolt 5.

As before stated the aperture 11 of the locking member 10 normally partially alines with the aperture 9 of the nut 7, so that when it is desired to release the tooth 13 from engagement with the shank of the bolt, a pin 15 which has formed thereon a pointed end 16, is driven into the aperture 11, until the point 16 of the pin or key 15 engages in the aperture 9 of the nut 7. As soon as this operation is performed and the apertures 11 and 9 aline, the nut will be free to be unthreaded from the bolt in view of the fact that the tooth 13 will be released from engagement with the threaded shank of the bolt 5.

In operation the locking member 10 is placed in the depressed portion 8 of the nut 7, and the nut threaded on the bolt in the usual manner. When the nut is threaded on the bolt to the desired point, it will be seen that the same is automatically locked thereon by the tooth 13 engaging with the threaded shank of the bolt and the unthreading operation limited by the provision of the longitudinal slot 6. Although only one longitudinal groove 6 is provided it is of course understood that a plurality of the same may be formed in the bolt at intervals thereon, so as to prevent any reverse movement of the nut on the bolt, if so desired. However for the ordinary use such as on railroads or the like the longitudinal grooves may be eliminated as it will be seen that the tooth 13 will bite in the threaded shank of the bolt 5 so as to prevent the unthreading of the nut from the bolt, due to the ordinary causes, namely vibration or the like, and the same is only necessary to be used where a more positive locking means is desired. When it is desired to remove the nut from the bolt, the same may be readily done by inserting the pin in the apertures 9 and 11, so as to release the tooth 13 from the threaded shank of the bolt 5 as before stated.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent is:—

In combination with a bolt, a nut threaded on the bolt having a portion of one of its faces cut out to provide a rectangular recess, a locking member in the recess provided with a central bore, having its outer marginal edges snugly engaged with the walls of the recess, said locking member being slit to provide a tooth which normally protrudes into its bore for engagement with the bolt, and provided with an opening adapted to aline, with an opening in the nut when the tooth is disengaged from the bolt, said opening adapted to receive a pin for holding the tooth disengaged from the bolt to permit removal of the nut from the bolt.

In testimony whereof I affix my signature in presence of two witnesses.

EZRA M. CONRAD.

Witnesses:
W. G. BRUMBAUGH,
MARY BRUMBAUGH.

Copies of this patent may be obtained for five cents each, by addressing the "Commissioner of Patents, Washington, D. C."